J. E. & P. D. THROPP & A. DE LASKI.
MACHINE FOR MAKING OR BUILDING UP PNEUMATIC TIRES.
APPLICATION FILED SEPT. 19, 1913.

1,137,365.

Patented Apr. 27, 1915.

Witnesses:

Inventors:

J. E. & P. D. THROPP & A. DE LASKI.
MACHINE FOR MAKING OR BUILDING UP PNEUMATIC TIRES.
APPLICATION FILED SEPT. 19, 1913.

1,137,365.

Patented Apr. 27, 1915.
6 SHEETS—SHEET 3.

UNITED STATES PATENT OFFICE.

JOHN E. THROPP AND PETER D. THROPP, OF TRENTON, AND ALBERT DE LASKI, OF WEEHAWKEN, NEW JERSEY, ASSIGNORS TO THE DE LASKI AND THROPP CIRCULAR WOVEN TIRE COMPANY, OF TRENTON, NEW JERSEY, A CORPORATION OF NEW JERSEY.

MACHINE FOR MAKING OR BUILDING UP PNEUMATIC TIRES.

1,137,365. Specification of Letters Patent. Patented Apr. 27, 1915.

Original application filed January 24, 1912, Serial No. 673,069. Divided and this application filed September 19, 1913. Serial No. 790,691.

*To all whom it may concern:*

Be it known that we, JOHN E. THROPP, PETER D. THROPP, and ALBERT DE LASKI, citizens of the United States, said JOHN E. THROPP and PETER D. THROPP being residents of Trenton, in the county of Mercer and State of New Jersey, and said ALBERT DE LASKI being a resident of Weehawken, in the county of Hudson and State of New Jersey, have invented a new and useful Machine for Making or Building Up Pneumatic Tires, of which the following is a specification.

This invention relates to a machine for making or building up pneumatic tires, and more particularly to making so-called shoes or casings for covering the inner tube in the type of pneumatic tires known as the double tube variety.

Among the objects of this invention are to provide a machine of this character which may be readily manipulated by one operative, which will make tires much more rapidly and much more uniformly than they can be made by hand, and which will occupy a minimum of floor space.

Other objects are to provide certain improvements in the form, construction and arrangement of the several parts whereby the greatest known perfection of tire building is attainable, and the above mentioned objects effectively carried out.

A practical embodiment of our invention is represented in the accompanying drawings, in which—

The apparatus comprises a casing denoted by 1, which is secured to a suitable base 2 by bolts 3, which base 2 may, in turn, be secured at any desired place by fastening devices passing through holes 4. This casing 1 is provided at one side with a suitable boss 5 fitted with ball bearings 6 and thrust bearings 7 in which is journaled a rotatable shaft 8, the inner end of which shaft extends through the casing and is journaled in the other side thereof at 9, while the outer end projects therefrom and is fitted to receive the core upon which the tire is to be built, as will be hereinafter described.

The shaft 8 is provided with a spur gear 10 rotatably mounted thereon, which spur gear 10 is fitted to engage a spur gear 11 mounted against rotation on the jack shaft 12 journaled in the casing 1 below the shaft 8, and which shaft 12 also carries a spur gear 13 mounted against rotation thereon and fitted to engage a pinion 14 mounted against rotation on a power driven shaft 15 journaled in the casing 1 below the shaft 12. The jack shaft 12 is provided at its front end with a pinion 12* mounted against rotation thereon and fitted to engage a large gear 16 rotatably mounted on the shaft 8.

The shaft 15 is positively driven through the belt 17 which engages the pulley 18 secured against rotation to the end of the shaft 15, and which belt 17 is itself driven from a suitable source of power, as will be hereinafter fully described.

Mounted against rotation on the shaft 8 intermediate the gear 10 and gear 16 is a friction cone clutch 19 and a jaw clutch 20 arranged to be operated from a cross shaft 21 to which is secured a pair of handles 22 for convenient manipulation thereof. When the friction clutch 19 is thrown into locking position, it holds the small gear 10 against rotation on the shaft 8 and the said shaft will consequently be driven at a relatively high speed through the driven shaft 15 and the train of gears 14, 13, 11, 10. When the jaw clutch 20 is thrown into locking position, the large gear 16 will be fixed against rotation on the shaft 8 and the latter will be driven at a relatively slow speed through the driven shaft 15 and the train of gears 14, 13, 12*, 16. When the shaft 8 is driven at relatively high speed as first mentioned, the large gear 16 will rotate idly on the shaft 8; and when the shaft 8 is driven at low speed the small gear 10 will rotate idly thereon. The handles 22 may be thrown in such a position that neither clutch is in locking engagement, in which case the gears 10 and 16 will be idly rotated on the shaft 8 while the latter remains still. The belt 17 also engages a small pulley 23 mounted against rotation on a shaft 24, which shaft carries a variable cone 25 which itself is driven from a steady speed cone 26 by a sliding belt 27. The steady speed cone 26 is mounted on a shaft 28 which is provided at either end with pulleys 29, 30, which pulleys are connected by means of a straight belt 31 and crossed belt 32, respectively, to pulleys 33, 34, fixed on a shaft 35 driven from a suitable source of power, not shown.

A pair of clutches 36, 37, are mounted on the shaft 28 and arranged to be operated by a lever 38 so as to throw either the pulley 29 or the pulley 30 into driving engagement with the steady speed cone 26. When the pulley 29 is in driving engagement with the cone 26, the latter is driven in one direction, and when the pulley 30 is in locking engagement with the said cone it is driven in the reverse direction owing to the crossing of the belt 32. A rod 39 has a screw and nut engagement with the belt 27, and is provided with a hand wheel 40 for sliding the belt 27 in either direction on the cones 25 and 26 for varying the speed of the cone 25 and hence varying the speed of the driven shaft 15 in the casing 1.

From the above described arrangement of belts, pulleys, cones, shafts, clutches, and gears, it will be seen that the shaft 8 can be rotated in either direction and at varying speeds. It will also be seen that with a certain fixed speed for the driven shaft 15, the shaft 8 may be rotated either forward or backward at a high and a low speed. Thus there is provided suitable arrangements for adapting the rotation of the shaft 8 both in direction and speed to the most precise demands of any part of the operation of building the tire. The apparatus also includes mechanism for supplying material of which the tire is to be constructed to the core upon which the latter is to be formed, which mechanism, as shown in the drawings, comprises an overhanging stanchion 41 firmly secured to the top of the casing 1 by bolts 42. This stanchion 41 has a hollow cylindrical head 43 vertically disposed directly above the core to be hereinafter described.

This head 43 has a frame support 44 of inverted U-shape secured to the top of the head by bolts 45, which frame 44 has a centrally disposed vertical hole fitted to receive a screw 46. This screw 46 has a screw threaded engagement with a miter gear 47 supported on top of the frame 44 by an interposed thrust bearing 48, which miter gear 47 is in engagement with a miter pinion 49 secured to one end of a short transverse shaft 50 horizontally journaled in a support 51 bolted to the top of the frame 44 as at 52. A second miter pinion 53 is secured to the other end of the shaft 50, and it, in turn, is in engagement with a third miter pinion 54 secured to the upper end of a rod 55. This rod 55 is rotatably mounted in a pair of brackets 56, 57, fastened to the side of the frame 44 and the hollow head 43 by bolts 58 and 59 respectively; and is provided with a hand wheel 60 fixed to its lower end for convenient manipulation by the operative.

A hollow cylinder 61 is fitted to reciprocate vertically in the head 43 and is secured at its upper end to the screw 46. To the lower end of this cylinder 61 is fastened a frame 62 by means of screws 63, which frame 62 has a pair of downwardly extending arms 64, 65. The arms 64, 65, have suitable bearing supports for the stock roll 66, which is arranged to carry the fabric 67 from which the tire is to be constructed; the friction or resistance roll 68 and guide rollers 69, 70, 71. The friction roll 68 is preferably composed of some material which has a surface of such a nature as to cause considerable friction between it and the fabric of which the tire is to be composed, wood being found very suitable for this purpose. The guide rollers 69, 70, 71, are preferably composed of metal, such as steel, and are so located that the distance between the axes of any two of them is less than the diameter of the resistance roll 68. The resistance roll 68 is provided at one end with an enlarged drum 72 fitted with a brake band 73 which is arranged to be caused to grip the drum 72 with varying degrees of friction by means of the weight 74 slidably mounted upon the notched bar 75.

A rocking frame 76 is pivoted to the arms 64 and 65 of the frame 62 at 77 and 78, respectively, in which rocking frame is suitably journaled a take-up roll 79 adapted to receive the cloth which is commonly wound on the stock roll 66 with the tire fabric 67. This take-up roll 79 is caused to engage the fabric 67 on the roll 66 with varying degrees of friction by means of the weight 80 which is slidably mounted on a rod 81 secured to the outer edge of the rocking frame 76, and arranged to be fastened at various positions along the rod 81 by a set screw 82. A hook 80* is located above the frame 76 and arranged to engage the latter when it is swung upwardly for the purpose of holding the roll 79 out of engagement with the fabric 67 on the stock roll 66. The frictional engagement of the take-up roll 79 with the stock roll 66 causes the former to be rotated by the latter and hence to take up the cloth as the fabric is unwound from the roll 66.

The parts just described as being mounted in the frame 62 are arranged to be vertically adjusted as a whole through the engagement of the frame 62 with the cylinder 61, which, in turn, is secured to the screw 46. It will be seen, from the description, that by rotating the hand wheel 60, the miter gear 47 will be turned upon the screw 46 and will either raise the latter or lower it, owing to the well known action of the screw and nut principle. This raising and lowering of the screw 46 will carry the frame 62 and all its appurtenances with it.

While we have shown a manually operated screw and nut for the purpose of adjusting these parts, we do not at all intend to limit the structure to such a mechanical arrangement as any well known means for effecting this result either by hand or by power is perfectly suitable for the purpose. The machine also includes apparatus for mechanically building or forming the tire material onto the core and this apparatus, in the form shown in the drawings, comprises a laterally extending bracket 83 which is firmly secured to the casing 1 by bolts 84.

A laterally extending carriage 85 is mounted on the bracket 83 to slide transversely along the front of the casing 1. This sliding movement of the carriage 85 is effected by a screw 86 which is threaded into a nut 87 in the carriage 85, and which screw 86 is adapted to be rotated manually by a hand wheel 88 and mechanically by miter gears 89 and 90 driven from the shaft 12 through sprockets 91 and 92, chain 93, and clutch 94. The clutch 94 is provided with a knock-off 95 so located as to be engaged by a roller 96 fixedly secured on the end of a slide 96*, which slide has a pin and slot engagement with a set screw 85* on the carriage 85, for securing the said slide in any desired longitudinal adjustment. The engagement of the roller 96 with the knock-off 95 may be so timed that the clutch 94 will be disengaged from the miter gear 89 and hence the screw 86 cease to be power driven at any desired point in the movement of the carriage 85. It will be understood that the carriage 85 may be reciprocated at any point by the manual operation of the hand wheel 88. A pair of similar curved arms 97 are fulcrumed at 98 in the carriage 85 by pivots 99 mounted in suitable ball bearings 100 as clearly shown in Fig. 4. The arms 97 are secured by means of cords 101 passing over pulleys 102 to weights 103, which weights tend to draw the arms 97 toward each other and hence toward the core 104 upon which the tire is to be built; which core is supported by an adjustable spider 105 fixed against rotation on the protruding end of the shaft 8 whereby the core 104 is caused to rotate with and at the speed of the shaft 8. If desired, coil springs 101* may be secured to the cords 101 and weights 103 to obviate any jerkiness in the action of the said weights.

The pulleys 102 are mounted on brackets 106 at a distance from the fulcrum points 98 of the arms 97 substantially equal to the distances from the said fulcrum points to the points 107 at which the ends of the cords 101 are secured to the arms 97, thus insuring that the weights will have substantially the same pull on the arms throughout the swing of the latter about their fulcrums.

The arms 97 are each provided with a rearward extension 108, which extensions in turn have at their extremities standposts 109 provided with transverse holes fitted to receive connecting rods 110 secured, at diametrically opposite points, to a circular disk 111 which has a hub 112 provided with a worm gear 113 fitted to engage a worm 114 fixed to the end of a transverse rod 115 journaled in a lug 116 on the carriage 85 and provided at its outer end with a hand wheel 117 for manual operation. The standposts 109 are interiorly screw threaded for engagement with set screws 118 fitted to engage the connecting rods 110 for locking them in any desired position in the standposts 109.

The arrangement of parts just described permits the operator to lock the connecting rods 110 in the standposts 109 by means of the set screws 118, and then by manually operating the hand wheel 117 swing the arms 97 about their fulcrum points 98 in either direction. The advantage of this structure will be fully described in setting forth the operation of the machine.

Figures 4, 5, 6:
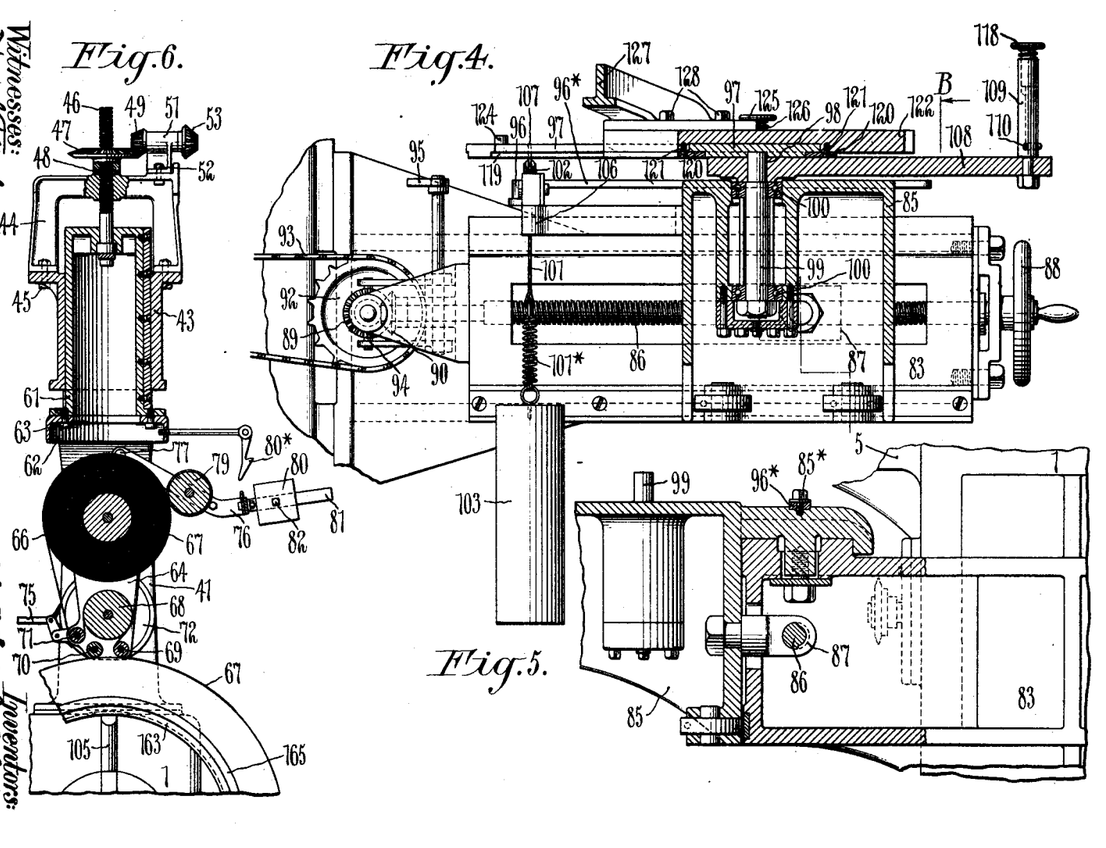
Fig. 4 represents an enlarged detail section taken in the plane of the line A—A of Fig. 3, looking in the direction of the arrows.
Fig. 5 represents a detail section taken in the plane of the line B of Fig. 4, looking in the direction of the arrow.
Fig. 6 represents a detail vertical section showing the head, supply roll and adjacent parts.

The curved arms 97 are undercut as clearly shown at 119, Fig. 4, whereby they are fitted to receive curved plates 120 secured by means of screws 121 to the curved slides 122 mounted to oscillate arcuately on the curved arms 97. These slides 122 are provided with curved slots 123 fitted to receive the pins 124 which are adapted to abut against the inner ends of the slots 123 when the slides 122 have been swung to the limit of their outward movement, thus preventing further movement of the said slides 122, while pins 124* limit their inward movement. The slides 122 are further provided with set screws 125 which are arranged to be screwed down against the tops of the arms 97 for locking the slides 122 in any position on the said arms. These set screws 125 may be provided with locking springs 126 for preventing the accidental loosening of the said set screws.

Bracket arms 127 are securely fastened to the outer ends of the curved slides 122 by screw bolts 128, and extend inwardly in substantially a radial direction from the said slides. The bracket arms 127 terminate in hollow heads 129 in which are journaled shafts 130 by means of suitable ball bearings 131, which shafts 130 are provided on their outer ends with disk shaped forming rolls 132 secured against rotation thereon. These disk-shaped forming rolls 132 are so mounted that their operating face or edge, which is adapted to engage the material on the core, is at the center of the circle through an arc of which the slides 122 are mounted to oscillate, thereby permitting the slides 122 to be moved and the angle of engagement of the disk rolls 132 with the material on the core to be varied, without moving the operative face of the said rolls. The shafts 130 are connected by means of universal joints 133, shafts 134 and trains of gears 135, partly supported by brackets 136 mounted on the slides 122 and having suitable ball bearings 137, with electric motors 138 also mounted on the curved slides 122 and arranged to be supplied with electricity from any convenient source.

The slides 122 may be provided with handles 139 for the convenient manual sliding thereof. The curved arms 97 carrying the slides 122, brackets 127 and forming rollers 132, are so positioned with respect to the core 104 that the forming rolls 132 will engage the said core considerably before the arms 97 have swung about their fulcrum points 98 to the limit of their inward movement.

The machine also includes mechanism for cutting or trimming off the superfluous edges of the tire material after it has been formed on the core 104, which mechanism comprises a horizontally disposed swinging arm 140 pivoted at 141 to a plate 142 slidably mounted on a boss 143 secured to the casing 1 opposite to the bracket 83 by screw bolts 144. The sliding plate 142 is fitted to reciprocate in a direction parallel to the reciprocation of the carriage 85, and the reciprocation of the plate 142 is effected by means of a screw 145 having a threaded engagement with a nut 146 secured to the plate 142. which screw 145 is rotated by means of the hand wheel 147.

Figures 7, 8:
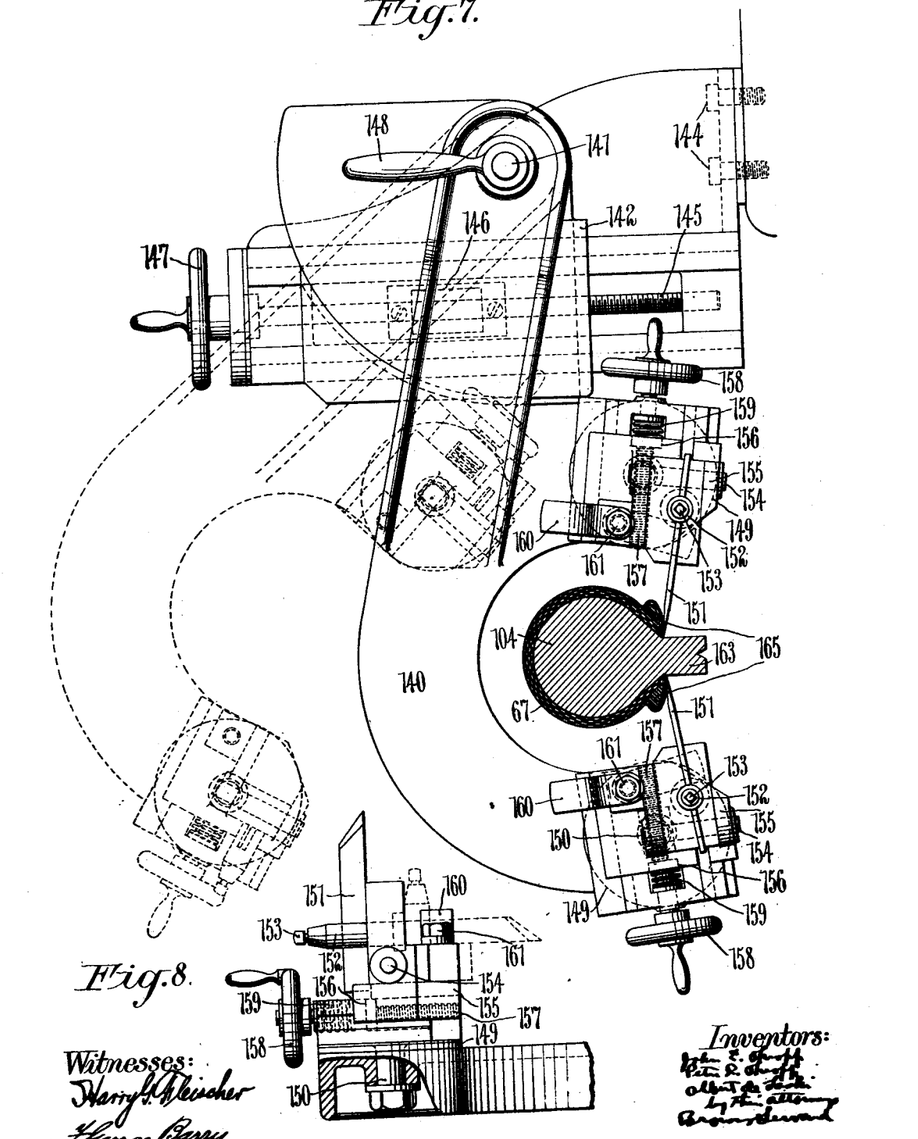
Fig. 7 represents an enlarged detail plan view showing the cutters for trimming the edges of the material, the core being shown in section.
Fig. 8 represents a detail side elevation of one of the cutting devices, parts being broken away.
Figure 9:
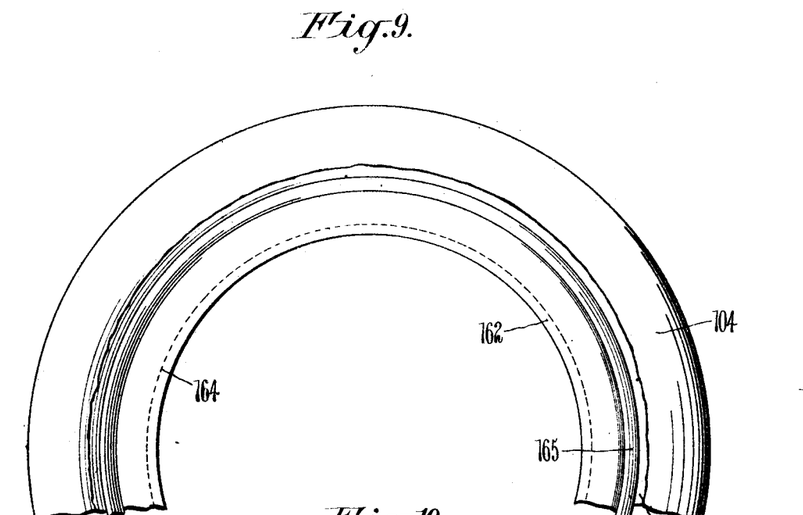
Fig. 9 represents a side elevation, partly broken away, showing the bead core placing ring on the core.

The arm 140 is provided at the pivot 141 with a clamping handle 148 screw threaded onto the pivot 141 for the purpose of locking the arm 140 in any desired position. The arm 140 is bifurcated at its outer end to embrace the core 104 and is provided with a pair of swivel plates 149 mounted to rotate on the said arm 140 about the pivots 150, and carrying knives 151 clamped in upright studs 152 by set screws 153. These knives are fitted to swing in a vertical plane for about ninety degrees, i. e., from the horizontal to the vertical, about pivots 154; and the knife supports 155 slidably mounted on the swivel plates 149 are provided with nuts 156 having screw threaded engagement with screws 157 arranged to be operated by hand wheels 158 for advancing the knives toward one another or withdrawing them from one another. Coil springs 159 may be placed between the knife supports 155 and the end of the swivel plates 149 for yieldingly holding the knives 151 at the limit of their projection. The knife supports may further be provided with swinging keepers 160 screw threaded therein at 161, which may be swung over the knives 151, as shown in dotted lines, Fig. 8, for the purpose of preventing the knives from moving from a horizontal position in case the direction of rotation of the core 104 should be reversed.

The machine also includes a pair of bead placing rings 162 fitted to engage the side faces of the tongue or rib 163 of the core 104 and also provided with shoulders 164 for engaging the inner edge of the core tongue 163 for holding the bead placing rings concentric with respect to the core 104. The bead placing rings extend far enough up on the sides of the core so as to provide seats for accurately locating the bead cores 165 of the tire, as will be hereinafter described.

In operation, the material of which the tire is to be composed, commonly called friction fabric or duck, is placed upon the stock roll 66 with the customary interposed cloth; the said fabric being placed on the roll 66 in the already cut bias lengths of suitable size, according to the tire that is to be built, which are customarily supplied in tire manufacture; but it is not necessary to place these strips of friction fabric in any particular order as to their cut. The advance edge of the friction fabric is passed under the guide roll 71, over the friction roll 68 and under either of the guide rolls, 69, and 70, and pressed firmly upon the periphery of the core 104. At the same time, the advance edge of the interposed cloth is wrapped about the take-up roll 79 which is permitted to frictionally engage the fabric 67 on the roll 66. The weight 74 is suitably adjusted on the rod 75 to cause the desired resistance to rotation of the roll 68. The hand wheel 60 may be rotated so as to depress the frame 62 and its appurtenances until they are the desired distance away from the periphery of the core 104.

The belt 27 on the change speed cones 25, 26, may be moved to the desired position so as to give the proper surface speed to the periphery of the core; either clutch 36 or 37 may be thrown in by the lever 38 so as to provide the desired rotation to the driven shaft 15; after which the jaw clutch 20 may be thrown into driving engagement for rotating the shaft 8 at low speed. As the shaft 8 is rotated, it will, in turn, rotate the core 104 drawing the friction fabric off of the stock roll 66, and stretching the latter tightly about the periphery of the core 104. It will be seen that in preparing for this operation, the resistance on the roll 68 may be varied so as to get exactly the desired amount of stretching in the friction fabric on the periphery of the core; and that this stretch or tension will be exactly uniform throughout the circumference of the core, and may be much greater than that possibly attained by the strongest operative. After one layer of fabric has been thus stretched completely about the periphery of the core, it may be formed down about the sides of the core as follows: With the set screws 118 locking the connecting rods 110, the hand wheel 117 may be turned so that the arms 97 are spread away from the core 104 a sufficient distance to permit the arms to be advanced toward the core radially with respect thereto by means of the hand wheel 88 without engaging the periphery of the core. The hand wheel 88 may then be rotated, advancing the arms 97 to the desired position, after which the hand wheel 117 may be rotated so as to permit the arms 97 to move toward one another until the disk forming rolls 132 engage the friction fabric on each side of the core at about the point where the fabric ceases to show its stretch due to the previous action of drawing it on the core.

The clutch 94 may now be thrown into operative position to drive the screw 86, and the friction clutch 19 may be thrown into operative position to drive the shaft 8 and hence the core 104 at high speed: at the same time the electric motors 138 may be started at a speed sufficient to rotate the disk rollers 132 at a peripheral speed greater than the peripheral speed of that part of the core which they engage. The set screws 118 will be loosened so as to permit the arms 97 to act under the influence of the weights 103. As the core is rotated, the disk forming rolls will advance radially across the side thereof due to the action of the power driven screw 86, thus forming the fabric tightly about the sides of the core. The knock-off 95 will disengage the clutch 94 before the disk forming rolls 132 have gone completely down to the tongue of the core and the rolls may be fed the slight remaining distance by the hand wheel 88. After the first sheet of fabric has been thus formed completely about the core by the stretching and about the sides of the core by the disk forming rolls, a second sheet of fabric may be drawn onto the core in a manner precisely similar to that already described.

If the second strip of fabric was placed on the stock roll 66 with its threads at right angles to the first strip of fabric, it will be stretched upon the core by rotating the latter in the same manner and in the same direction as previously described, using the low speed. If, however, the second strip happens to have been placed on the stock roll with its threads lying in the same direction as the threads of the first strip, it will be stretched upon the core by rotating the latter in the reverse direction, the reversal of rotation of the core being obtained by engaging the one of the two clutches 36, 37, which was not engaged in the former operation. After this second strip has been thus stretched on the periphery of the core superposed on the first strip of fabric, it may be formed down about the sides of the core by the disk forming rolls 132 as previously described. This operation may be repeated, care being taken to rotate the core in such a direction as to cause alternate layers of fabric to lie with their threads at right angles to adjacent layers, until the tire has been built up to the stage at which the bead cores should be placed in position.

Figure 10:
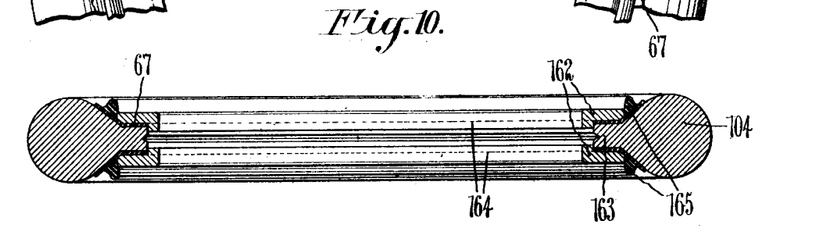
Fig. 10 represents a section through the parts shown in Fig. 9.

The bead placing rings 162 are now placed one on each side of the tongue of the core, as clearly shown in Fig. 10, it being customary to have one of the bead rings hanging on the shaft 8 between the casing 1 and the spider 105 in order that they may be ready for immediate use, or the bead placing rings may be split into semicircular form so as to be readily applied to the inner side of the core. The bead placing rings may be clamped temporarily in position on the core in any desired manner, and the previously formed bead cores 165 seated on the rings and pressed in position on the fabric already stretched on the core, the bead placing rings absolutely insuring the accurate location of the bead core. It is also convenient to have one of the previously formed bead cores hanging on the shaft 8 between the casing 1 and the spider 105, or the bead placing ring and one bead core may be hung on the casing 1 in any desired position so long as they surround the shaft 8. After the bead cores have thus been placed in position, the bead placing rings may be removed from the core and another strip or layer of friction fabric stretched thereon and formed down about the sides of the core, as previously described.

The roller 96 may now be set so as to engage the knock-off 95 as soon as the forming rolls 132 reach a point where they just touch the bead cores 165, so as to throw out the clutch 94 and stop the radial movement of the forming rolls, 132, with respect to the core. The point at which the roller 96 is set to effect the above mentioned result will vary according to the size of tire being operated upon. At this point, the operator may advantageously lock the set screws 118 on the connecting rods 110 and slowly feed the rolls 132 out across the top of the bead cores 165 to the outer edge thereof, thus causing the fabric to conform to the shape of the bead on top; the locking of the connecting rods 110 preventing the sudden engagement of the rolls 132 with the bead cores 165 from throwing the arms 97 violently apart; which action, if permitted, might cause damage to the tire.

Figure 1:
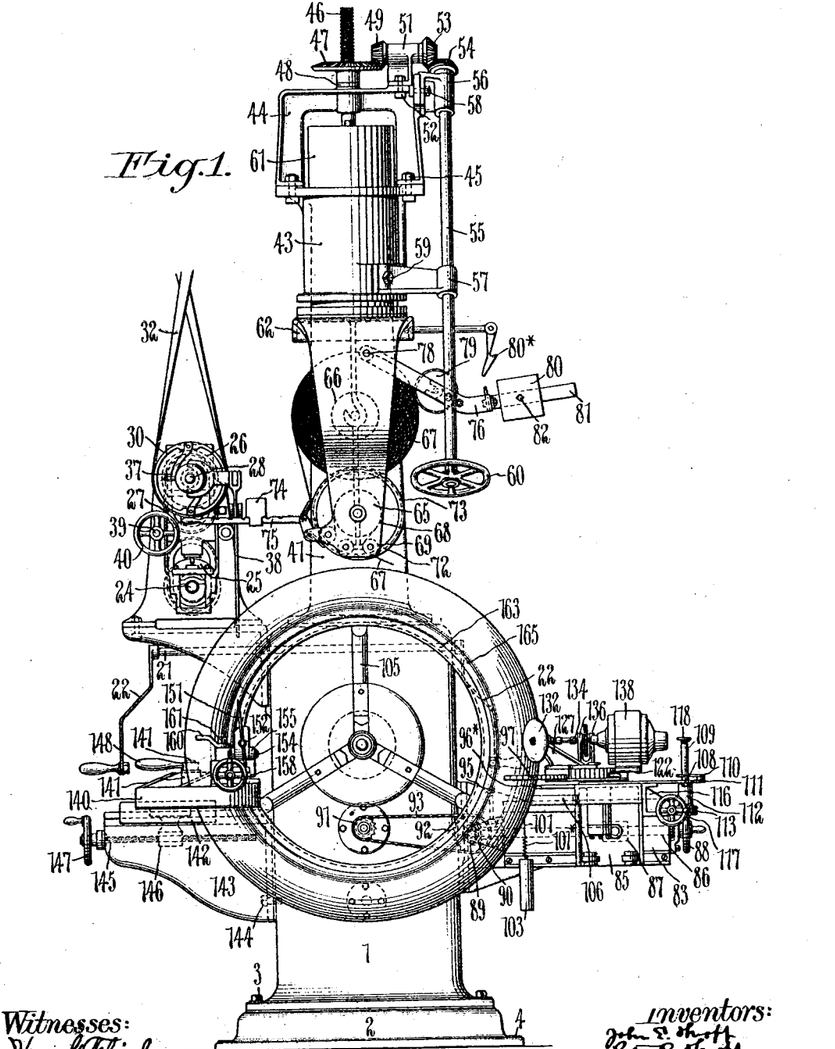
Figure 1 represents a front view of the entire apparatus.
Figure 2:
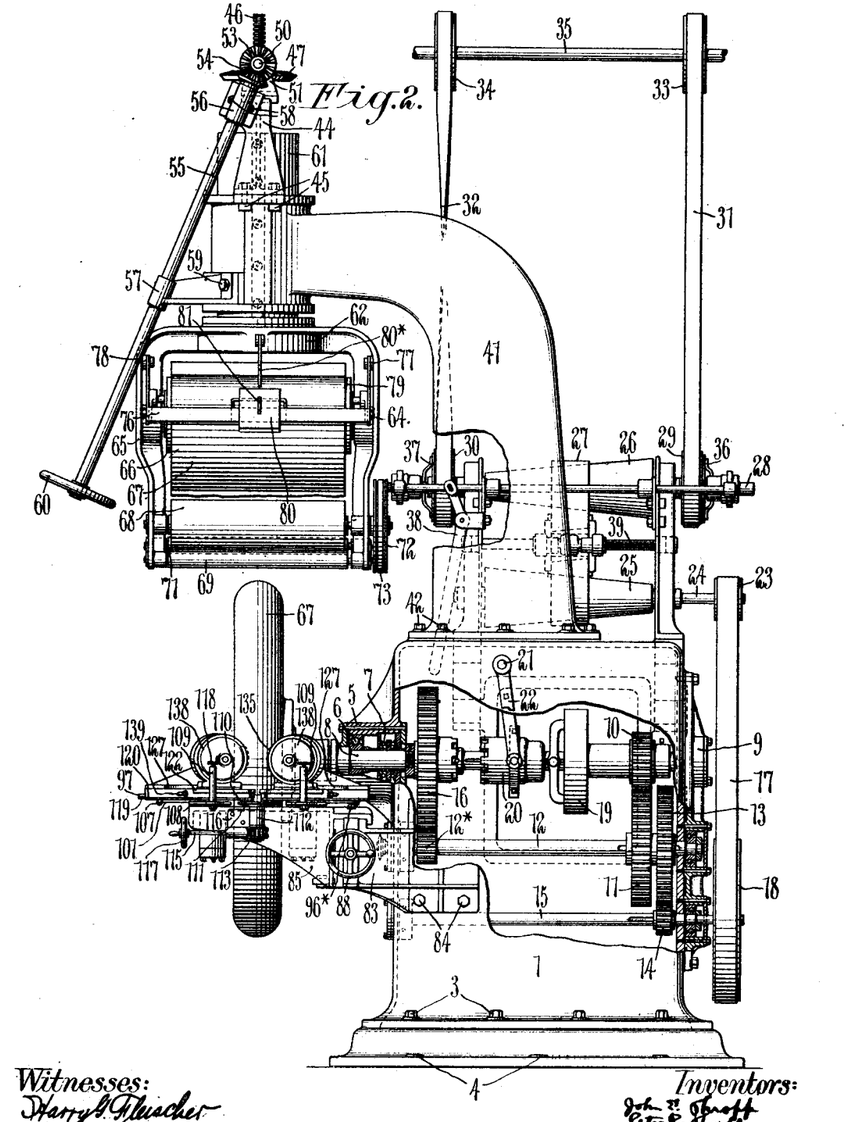
Fig. 2 represents a side view thereof, parts being broken away.
Figure 3:
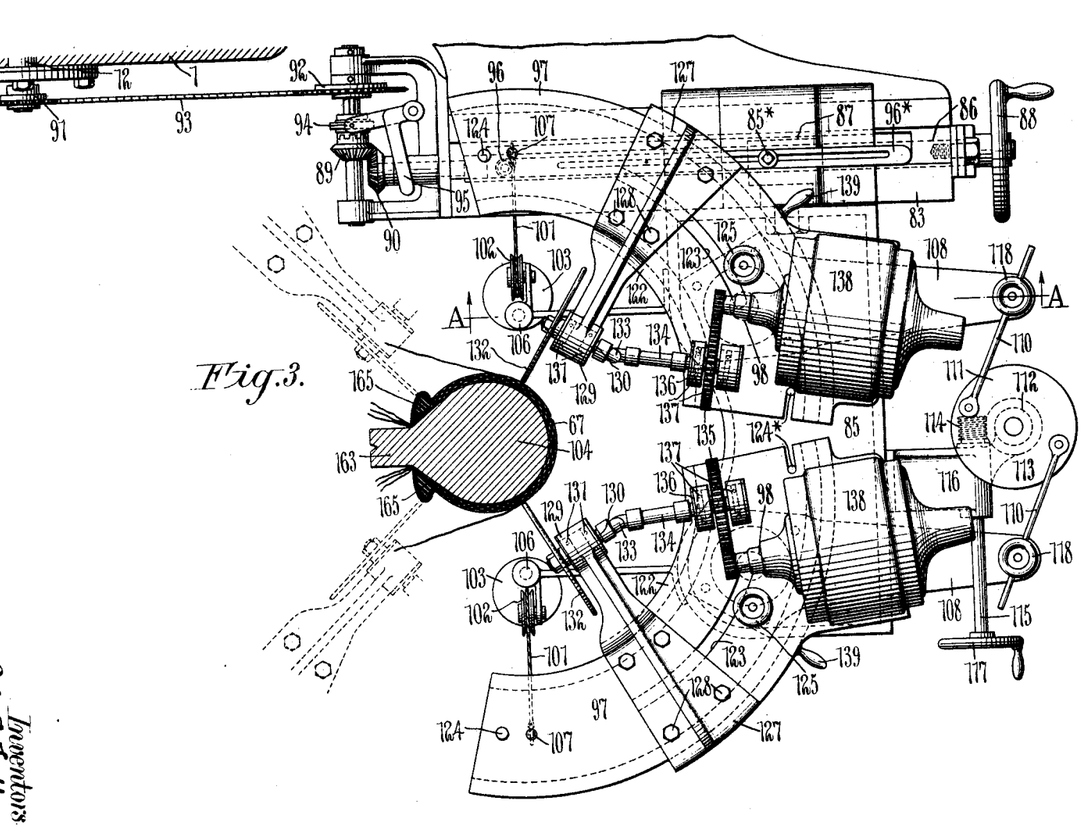
Fig. 3 represents a detail plan view of the devices for forming the fabric about the core, the latter being shown in section.

When the disk rolls have been fed outwardly until they engage the outer edge of the bead cores, the operator seizes the handles 139 and rapidly swings the slides 122 arcuately, toward the positions indicated in dotted lines, Fig. 3, so that the disk rolls may have a bearing almost at right angles to the lower face of the bead core. The set screws 118 are instantly loosened and the disk rolls fed ahead the short radial distance required to form the fabric down along the bottoms of the bead cores, by means of the hand wheel 88 connected to the feed screw 86, the weights 103 continuing to draw the rolls 132 laterally toward the tongue of the core. The requisite number of layers of fabric to complete the tire body or carcass are stretched and formed about the already placed layers and bead cores in a precisely similar manner; after which the swinging arm 140 carrying the knives 151 is swung around into the position shown in full lines, Fig. 7, and the knives fed up so as to engage the fabric at the lower point of the beads of the tire, by means of the hand wheels 158. The core 104 is then rotated by throwing in the low speed clutch 21, care being taken to rotate it in a direction appropriate to the cutting edges of the knives 151, and the said knives very rapidly trim off the superfluous edges of the fabric. If it should for any reason be desired to rotate the core in the reverse direction during the cutting operation, the cutting edges of the knives 151 can be reversed by loosening the set screws 153 and turning the knives 151 upside down; after which the keeper 160 may be swung over the knives, as shown in dotted lines, Fig. 7, to prevent the knives from rising from a horizontal position while the core is being rotated.

During the cutting operation, the coil springs 159 will permit the knives to yield if they meet any obstruction, and will also have the effect of holding the knives in firm engagement with the layers of fabric to be cut or trimmed off. While the arm 140 is being swung into operative position, shown in full lines, Fig. 7, the knives can be in the vertical position, shown in full lines, Fig. 8, so that they cannot, by any chance, hit the fabric on the core above the beads.

In the above description of the mode of operation it has been stated that one fabric layer may be stretched on and then formed down around the sides of the core; this operation being repeated until the desired number of layers or plies are in position. However, it is a fact that it is perfectly feasible to stretch a plurality of layers or plies of fabric on the periphery of the core, one after the other; and then form the group thus placed down about the sides of the core at one operation. This naturally tends to save some time. Also, the layers may be formed down about the sides of the core by following the described operations but without using the motors 138. It will further be noted that by means of the arcuate movement of the slides 122 on the curved arms 97, and the provision of the set screws 125 which serve to lock the said slides on the said arms, the angle at which the disk rolls 132 engage the fabric on the core for forming it down about the sides thereof, may be varied to a great extent. It is desirable to have this angle almost a right angle in order to get very firm pressure for thoroughly bonding the layers of fabric. This arcuate movement also permits the fabric plies to be perfectly formed about the bead cores, without the necessity of providing any other kind or character of forming rolls, or any other apparatus.

By using weights to draw the arms 97 continuously toward the core 104, and by placing the points of attachment to the arms 97 and the pulleys 102 at the places indicated, the action of the weights will be the same throughout the movement of the arms 97 toward the core 104. This arrangement is like fluid pressure and is far superior to the use of a spring, because the action of the latter becomes less and less as the arms advance toward one another.

The trimming of the fabric by the knives 151 has been described as a final operation of the machine, but it will be readily understood that this trimming can be resorted to at any time in the construction of the tire if desired.

After a tire has been built up by this machine as described, the core 104 carrying the tire, may be removed from the apparatus, either with or without the spider 105; after which the rubber tread may be placed thereon and the tire vulcanized or cured in any desired manner.

The forming rolls may be relatively small or large, but we have found that a diameter greater than the section of the core is desirable; and that it is particularly advantageous to rotate said rolls rapidly when the fabric, for any reason, fails to readily form about the sides of the core.

We have found that the mechanism described for stretching the fabric on the periphery of the core is so efficacious that the necessity for having a roll for forming the fabric on this part of the core is obviated. It will also be understood that the extent of the arcuate movement of the curved slide 122 in either direction may be fixed to suit particular conditions by varying the length of the slots 123 or the location of the pins 124 or 124*.

It will be understood that changes might be resorted to in the form, construction and arrangement of the several parts without departing from the spirit and scope of the invention; hence we do not wish to limit ourselves strictly to the structure herein set forth, but

What we claim is:—

1. A machine of the character described, comprising a source of tire fabric supply, a core upon which the tire may be built, a pair of guide rolls mounted intermediate the source of fabric supply and the core, said guide rolls being substantially equidistant from the core and lying in substantially the same plane as the core, and means for rotating the core in either direction, whereby the fabric may be drawn over one of the said guide rolls and onto the core when the latter is rotating in one direction and over the other of the said guide rolls and onto the core when the latter is rotating in the other direction and the fabric be thereby drawn onto the core in the desired arrangement.

2. A machine of the character described comprising a casing, an overhanging stanchion mounted thereon, a source of tire material supply carried by said stanchion, a rotatable core upon which a tire may be built mounted below said source of supply, and means for adjusting the source of supply in the stanchion toward and away from the core.

3. A machine of the character described comprising a casing, an overhanging stanchion mounted thereon, a source of tire material supply carried by the stanchion, a rotatable core upon which a tire may be built journaled in the casing below the source of supply, and means for reciprocating the source of supply in the stanchion toward and away from the core.

4. A machine of the character described comprising a casing, an overhanging stanchion mounted thereon and provided with a hollow head, a rotatable core upon which a tire may be built journaled in the casing below the said head, and a source of tire material supply fitted to reciprocate in said head to move it toward and away from the core.

5. A machine of the character described comprising a casing, an overhanging stanchion mounted thereon and provided with a hollow head, a rotatable core upon which a tire may be built journaled in the casing below the said head, a frame fitted to reciprocate in said head, a roll for carrying tire material mounted in the frame, and means for reciprocating the frame toward and away from the core.

6. A machine of the character described, comprising a rotatable core upon which a tire may be built, means for rotating the core in both directions, a source of tire material supply, and means for guiding the material to the core and for resisting the passage of the material, said means being located intermediate the source of supply and the core and including four rolls, one greater in diameter than the others, the larger roll being farthest away from the core, two of the small rolls being substantially equidistant therefrom, and the third small roll being at an intermediate distance from the core, whereby the material may be led from the source of supply under the intermediate roll, over the large roll, under one of the other small rolls, and thence to the core, the material contacting with a different one of the two small rolls nearest the core when the rotation of the core is reversed.

7. A machine of the character described comprising a rotatable core upon which a tire may be built, means for rotating the core in both directions, a source of tire material supply, and means for guiding the material to the core and resisting the passage of the material, said means including four rolls, one greater in diameter and located farther away from the core than the others, two of the small rolls being equidistant from the core, and the third small roll being at an intermediate distance from the core.

8. A machine of the character described comprising a casing, an overhanging stanchion mounted thereon, a source of tire material supply carried by the stanchion, a rotatable core upon which a tire may be built journaled in the casing below the source of supply, guide and resistance rolls also carried by said stanchion and means for adjusting the source of supply and the rolls in the stanchion toward and away from the core.

9. A machine of the character described comprising a casing, an overhanging stanchion mounted thereon and provided with a hollow head, a frame fitted to reciprocate in said head and carrying a source of tire material supply and guide and resistance rolls, a rotatable core upon which a tire may be built journaled in the casing below said frame, and means for reciprocating the frame in the stanchion head to move the frame and the parts carried thereby toward and away from the core.

10. A machine of the character described comprising a casing for the driving gears, said casing having a substantially flat side, an overhanging stanchion mounted thereon, a source of tire material supply carried by said stanchion over the said side of the casing, and a rotatable core upon which the tire may be built journaled in the said side of the casing below the said source of supply with its plane substantially parallel to the said side of the casing.

11. A machine of the character described, comprising a casing for the driving gears, a core upon which a tire may be built journaled in said casing, means for supplying tire material to the core, means for forming the material thereon, and mechanism for trimming off the edges of the material, said mechanism comprising a support pivotally mounted on the casing and adapted to swing radially with respect to the core into and out of operative position, said support having a bifurcated end adapted to embrace the core when in operative position, and a cutter mounted in the bifurcation of the support.

12. A machine of the character described comprising a core upon which a tire may be built, means for supplying tire material thereto, means for forming the material thereon, and mechanism for trimming off the edges of the material, comprising a support adapted to swing into and out of operative position with respect to the core, and a cutter yieldingly and adjustably mounted in the end of said support.

13. A machine of the character described, comprising a casing for the driving gears, a core upon which a tire may be built journaled in said casing, means for supplying tire material to the core, means for forming the material thereon, and mechanism for trimming off the edges of the material, said mechanism comprising a support pivotally mounted on the casing and adapted to swing radially with respect to the core into and out of operative position, said support having a bifurcated end adapted to embrace the core when in operative position, and a pair of cutters mounted in the birfurcations of the support.

14. A machine of the character described comprising a core upon which the tire may be built, means for supplying tire material thereto, means for forming the material thereon, and mechanism for trimming off the edges of the material, comprising a bifurcated support adapted to swing into and out of operative position with respect to the core, and a pair of cutters yieldingly and adjustably mounted in the bifurcations of the support.

15. A machine of the character described, comprising a core upon which a tire may be built, means for supplying tire material thereto, means for forming the material thereon, and mechanism for trimming off the edges of the material comprising a support having one end pivotally mounted and the other end bifurcated, the pivoted end being radially adjustable with respect to the core and the support being adapted to swing radially about its pivot with respect to the core into and out of operative position, and a cutter mounted in the bifurcated end of the support.

16. A machine of the character described comprising a core upon which the tire may be built, means for supplying tire material thereto, means for forming the material thereon, and mechanism for trimming off the edges of the material, comprising a bifurcated support radially adjustable with respect to the core and adapted to swing radially with respect to the core into and out of operative position so that when in operative position its bifurcated portion will embrace the core, and a pair of cutters mounted in the bifurcations of the support.

In testimony that we claim the foregoing as our invention we have signed our names, in presence of two witnesses, this ninth day of September, 1913.

JOHN E. THROPP.
PETER D. THROPP.
ALBERT DE LASKI.

Witnesses:
CLIFFORD W. LEE,
HARRY P. MESSLER